US007937474B2

(12) United States Patent
Hicks et al.

(10) Patent No.: US 7,937,474 B2
(45) Date of Patent: May 3, 2011

(54) METHOD AND APPARATUS FOR OFFLOADING NETWORK PROCESSES IN A COMPUTER STORAGE SYSTEM

(75) Inventors: Tom Hicks, Cranberry Township, PA (US); Michael L. Kazar, Pittsburgh, PA (US); Daniel S. Nydick, Wexford, PA (US); Andrew G. Reynolds, Cranberry Township, PA (US); Richard N. Sanzi, Jr., Gibsonia, PA (US); Fred Gohh, Pittsburgh, PA (US); David Graham, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 349 days.

(21) Appl. No.: 12/112,522

(22) Filed: Apr. 30, 2008

(65) Prior Publication Data

US 2008/0320142 A1 Dec. 25, 2008

Related U.S. Application Data

(60) Provisional application No. 60/914,819, filed on Apr. 30, 2007.

(51) Int. Cl.
*G06F 15/16* (2006.01)
*G06F 12/00* (2006.01)

(52) U.S. Cl. ........................................ 709/226; 709/250

(58) Field of Classification Search .......... 709/225–229, 709/203–205, 250, 220–221
See application file for complete search history.

(56) References Cited

U.S. PATENT DOCUMENTS

2005/0278382 A1 12/2005 LaRocca et al.
2006/0047850 A1* 3/2006 Singh Bhasin et al. ....... 709/238
2006/0056293 A1* 3/2006 Kumagai et al. .............. 370/229
2006/0080416 A1* 4/2006 Gandhi .......................... 709/220
2006/0215656 A1* 9/2006 Shirogane ...................... 370/389
2008/0065835 A1* 3/2008 Iacobovici et al. ........... 711/141
2008/0126599 A1* 5/2008 Wei et al. ........................ 710/22

FOREIGN PATENT DOCUMENTS

WO WO-2006/124911 A2 11/2006

OTHER PUBLICATIONS

U.S. Provisional Patent Application Serial No. 60/914,819, filed Apr. 30, 2007, entitled Method and Apparatus for Offloading Network Processes in a Computer Storage System, by Tom Hicks, et al., 41 pages.

"Notification of Transmittal of the International Search Report and the Written Opinion of the International Searching Authority, or the Declaration," International Filing Date: May 1, 2008, International Application No. PCT/US2008/005645, Applicant:: Network Appliance, Inc., Date of Mailing: Nov. 13, 2008, pp. 1-13.

* cited by examiner

*Primary Examiner* — Zarni Maung
(74) *Attorney, Agent, or Firm* — Cesari and McKenna, LLP

(57) ABSTRACT

A system and method for offloading network processes from main processors of a storage system and performing them on parallel processing modules. Embodiments of the present invention improve performance of a clustered storage system by performing certain network processes in an accelerator module of a storage system node. The accelerator module receives multi-protocol protocol data units (PDUs) from a network interface, performs protocol operations on the PDUs to form file system requests and passes the file system requests to a local D-module. If a file system request is directed to a non-local D-module in the cluster, the accelerator module repackages the request for transmission to the appropriate D-module and passes it back to the network without using local D-module processing resources or passing data over the system bus.

37 Claims, 9 Drawing Sheets

100
CLIENT 170
CONNECTION SYSTEM 180
N-MODULE 120
D-MODULE 130
NODE 200
DISK 140
CLUSTER SWITCHING FABRIC 160
CLIENT 170
N-MODULE 120
D-MODULE 130
NODE 200
DISK 140 ... DISK 140
DISK ARRAY 150

METHOD AND APPARATUS FOR OFFLOADING NETWORK PROCESSES IN A COMPUTER STORAGE SYSTEM

RELATED APPLICATIONS

The present application claims priority to U.S. Provisional Patent Application No. 60/914,819, filed Apr. 30, 2007, entitled METHOD AND APPARATUS FOR OFFLOADING NETWORK PROCESSES IN A COMPUTER STORAGE SYSTEM, by Hicks, et al., the contents of which are hereby incorporated by reference.

FIELD OF THE INVENTION

The present disclosure relates to computer storage systems and, in particular, to allocating resources used in performing network protocol operations.

BACKGROUND INFORMATION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system generally provides its storage service through the execution of software modules, such as processes. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information as a hierarchical structure of data containers, such as files and logical units stored on volumes. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume (hereinafter "volume") may be, although is not necessarily, associated with its own file system.

The storage system may be further configured to operate according to a client/server model of information delivery to thereby allow many clients to access data containers stored on the system. In this model, the storage system may be embodied as a file server executing an operating system, such as the Microsoft® Windows™ operating system (hereinafter "Windows operating system"). Furthermore, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. By supporting a plurality of storage (e.g., file-based) access protocols, such as the conventional Common Internet File System (CIFS) and the Network File System (NFS) protocols, the utility of the server is enhanced.

A plurality of storage systems or nodes may be interconnected to provide a storage system environment, e.g., a storage system cluster, configured to service many clients. Each node may be configured to service one or more volumes of the cluster, wherein each volume comprises a collection of physical storage disks cooperating to define an overall logical arrangement of vbn space on the volume(s). The disks within a volume/file system are typically organized as one or more groups, wherein each group may be operated as a Redundant Array of Independent (or Inexpensive) Disks (RAID).

In such a clustered storage system environment, substantial processing resources are dedicated to performing network interface operations on multi-protocol information. The network interface operations consume resources of the cluster, such as processors, which must also perform user mode applications, administration and disk access functions for the nodes. This problem is exacerbated by the need for a node to identify and redirect network information and storage system requests that are bound for a different node in the cluster. Further, each node generally includes a system bus which becomes a bottleneck that slows processing of certain requests. This bottleneck can degrade performance, for example, if a request that is received at a first node of a cluster, but is ultimately destined for another node traverses the main bus of the first node to be handled by a processor prior to forwarding the request to the other node.

SUMMARY OF THE INVENTION

The present invention solves the problems of the prior art by offloading network interface operations from a processor of a storage system (i.e. node) of a cluster and performing them on a parallel processing accelerator module. Embodiments of the present invention improve the cluster by performing certain network processes on the accelerator module of the node. Specifically, the accelerator module reduces bottlenecks associated with shared resources of the node such as, e.g., a system bus and memory. To that end, the accelerator module performs network interface processes on a "network side" of the system bus and relieves the system bus of traffic that is destined for a different node of the cluster. The accelerator module also includes dedicated memory resources that reduce the demands for system memory resources of the node.

Operationally, the accelerator module receives multi-protocol protocol data units (PDUs) from a network interface, performs protocol operations on the PDUs to form file system requests and passes the file system requests to a local disk element module (D-module) of the node. If a file system request is directed to a non-local D-module in the cluster, the accelerator module repackages the request for transmission to that D-module and passes it back to the network interface without using local D-module processing resources, e.g. a processor adapted to execute functions of the D-module. The accelerator module can be embodied as a kernel in the storage operating system or as storage system hardware.

The processes executed by the accelerator module are performed on a processor adapted to execute functions of a network element module (N-module) of the node in parallel with local operations (such as user mode applications, administration and disk access functions) performed on the local D-module processor. Network interface operations include, but are not limited to, Transmission Control Protocol/Internet Protocol (TCP/IP), User Datagram Protocol (UDP), Network File System (NFS) protocol, Common Internet File System (CIFS) protocol and Hyper Text Transfer Protocol (HTTP) operations.

In an illustrative embodiment, the accelerator module comprises circuitry including an accelerator processor on the "network side" of the shared system bus resource, such as a peripheral component interface (PCI) bus. Illustratively, an accelerator card including the accelerator module circuitry is plugged into the PCI bus of a storage system motherboard. Network interface operations that are performed on the accelerator card, or redirected from the accelerator card to the network interface, do not pass over the PCI bus. Since the PCI bus is shared among resources of the node, attempts to access the bus can create bottlenecks, thereby substantially degrading system performance; accordingly, the hardware embodiment of the accelerator card can further improve storage system performance by avoiding such bottlenecks.

The accelerator module illustratively comprises a plurality of interoperative modules adapted to handle PDUs in a plurality of network protocol formats. A packet and connection processor (PCP) module receives PDUs from a media access module. Operation parsing (OP) modules for each of a plurality of network protocols communicate with the PCP to establish stream connections for the PDU, allocate resources and provide instructions and data pointers to an appropriate Protocol Handler module described herein. The Protocol Handler module forms a file system request to a cluster fabric (CF) module, which processes and passes the file system request to a stream transport module.

The stream transport module, performs connection oriented functions, much like a TCP protocol layer, but is adapted more particularly for establishing and maintaining connections to communicate file system operations in a cluster of nodes. In an illustrative embodiment, the stream transport module determines whether the file system request is directed to a local processor of the node or is otherwise directed to a different node in the cluster. If the request is directed locally, the stream transport module passes the request to a host interface (HostIF) module. The HostIF module passes the request on to the local D-module and releases any resources that were allocated for the module. If the request is directed to another node, the stream transport module appends an address to the request and passes the request back to the PCP module. The PCP module passes the request on to the network via the media access module, and releases the resources that were allocated for the module.

Upon receiving the file system request, the D-module responds by passing a file system response back to the HostIF module. If the file system request originated on the local node, the response is sent to the accelerator module on the local node. In such cases, the HostIF module passes the response back to the appropriate Protocol Handler module via the stream transport module and CF module. The Protocol Handler module parses the file system response to form a correct protocol response PDU. The Protocol Handler enqueues the response PDU and provides a pointer for the PCP module to access the enqueued response.

If the file system request originated on the accelerator module of a non-local node, the response is sent to the accelerator module on the non-local node via the accelerator module on the local node. In such cases, the HostIF module passes the response to the PCP module of the local accelerator module via a local stream-transport module. The local PCP module passes the response to a PCP module on the non-local node via a network interface (media access layers). The non-local PCP module passes the response to a stream-transport module on the non-local node. The response is then passed to the non-local CF module and an appropriate non-local Protocol Handler. The non-local Protocol Handler forms and enqueues a correct protocol response PDU and provides a pointer for the PCP module to access the enqueued response.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION

Figure 1:
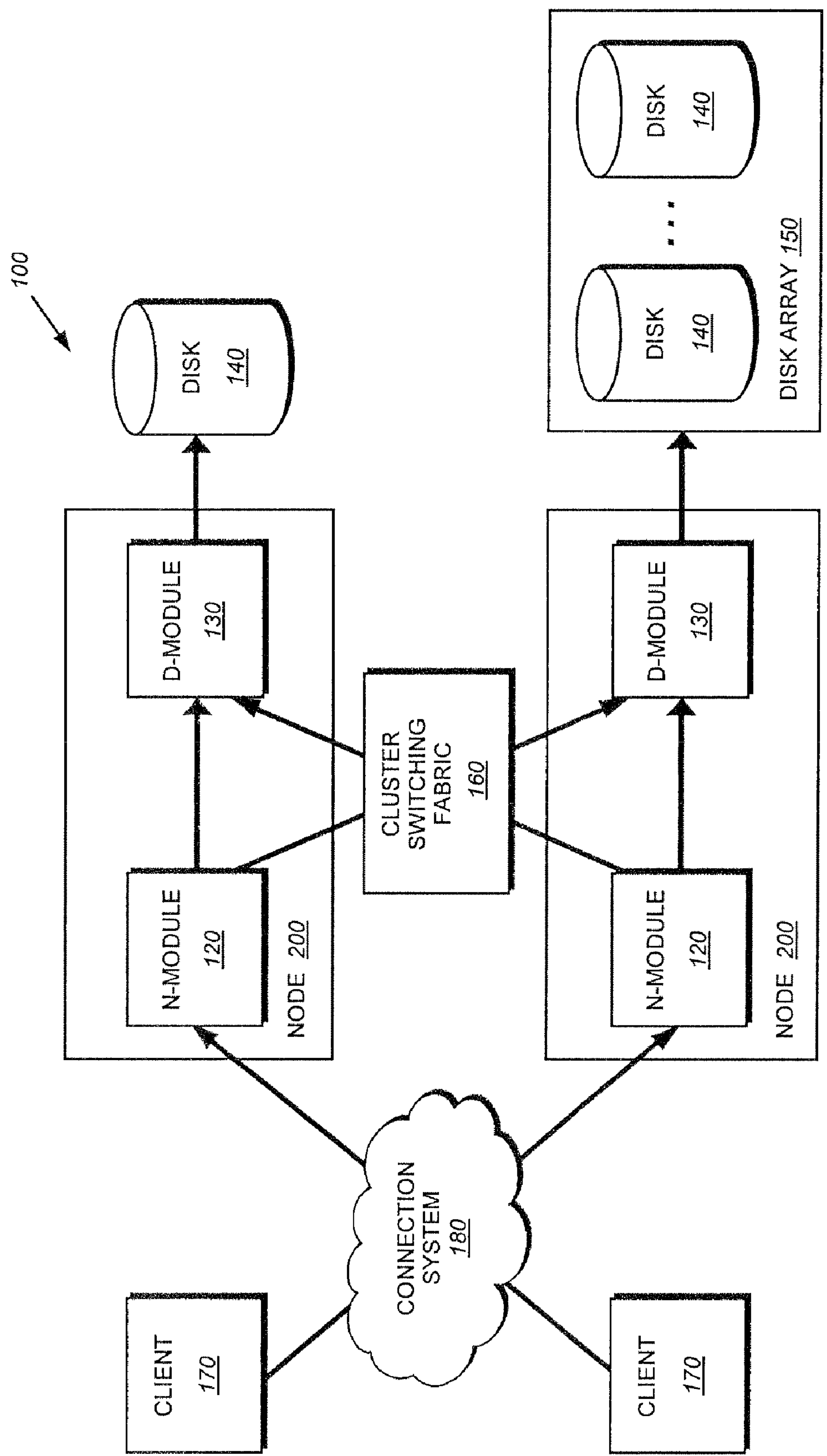
FIG. 1 is a schematic block diagram illustrating a cluster having a plurality of nodes in accordance with an embodiment of the invention.

FIG. 1 is a diagram illustrating a cluster 100 having a plurality of nodes in accordance with an embodiment of the invention. The nodes 200 comprise various functional components that cooperate to provide a distributed storage system architecture. To that end, each node 200 is generally organized as a network element (N-module 120) and a disk element (D-module 130). The N-module 120 includes functionality that enables the node 200 to connect to clients 170 over a connection system 180, while each D-module 130 connects to one or more storage devices, such as disks 140 or a disk array 150. The nodes 200 are interconnected by a cluster switching fabric 160 which, in the illustrative embodiment, may be embodied as a Gigabit Ethernet switch. It should be noted that while there is shown an equal number of N-modules and D-modules in the illustrative cluster 100, there may be differing numbers of N-modules and/or D-modules in accordance with various embodiments of the present invention. For example, there may be a plurality of N-modules and/or D-modules interconnected in a configuration of a cluster 100 that does not reflect a one-to-one correspondence between the N-modules and D-modules. As such, the description of a node 200 comprising one N-module and one D-module should be taken as illustrative only.

The clients 170 may be general-purpose computers configured to interact with the nodes 200 in accordance with a client/server model of information delivery. For example, interaction between the clients 170 and nodes 200 can enable the provision of storage services. That is, each client 170 may request the services of the node 200, and the node 200 may return the results of the services requested by the client 170, by exchanging packets over the connection system 180 which may be a wire-based or wireless communication system embodied as a computer network. The client 170 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client 170 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
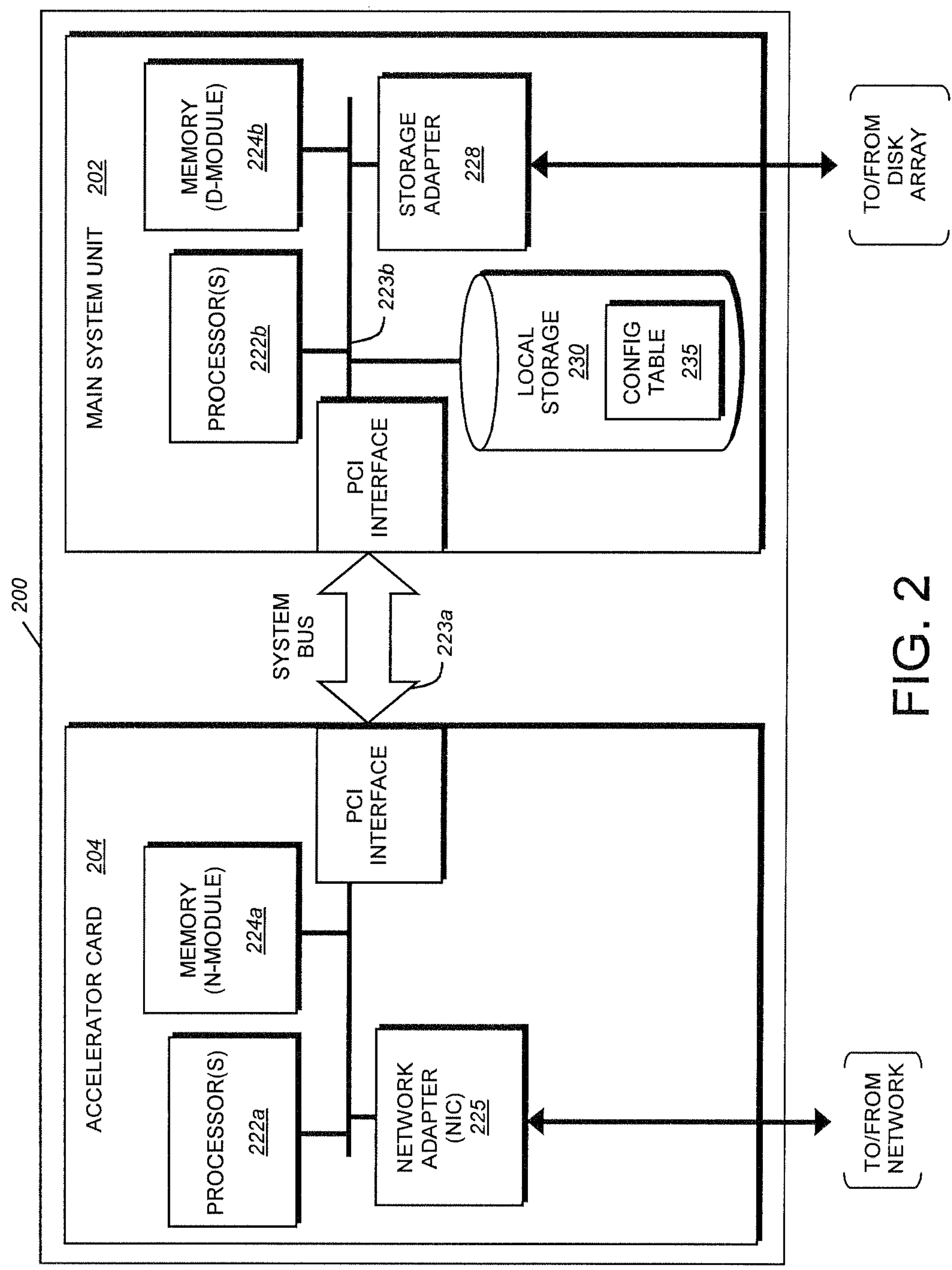
FIG. 2 is a schematic block diagram illustrating a node of the cluster, in accordance with an embodiment of the invention.

FIG. 2 is a diagram illustrating a node 200 of the cluster 100 in accordance with an embodiment of the invention. The node 200 is illustratively embodied as a storage system comprising a main system unit 202 and an accelerator card 204. Together the main system unit 202 and the accelerator card 204 include a plurality of processors 222*a,b*, a memory 224*a, b*, a network adapter 225, a storage adapter 228 and local storage 230 interconnected by a system bus 223*a, b*. The local storage 230 comprises one or more persistent storage devices, such as non-volatile random access memory or disk, utilized by the node 200 to locally store configuration information (e.g., in configuration table 235) provided by one or more management processes. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the network adapter 225 is utilized by the accelerator card 204 for communicating with other nodes in the cluster 100.

Each node 200 is illustratively embodied as a dual processor storage system executing a storage operating system 300 that preferably implements a high-level module, such as a file system, to logically organize the information as a hierarchical structure of data containers, such as volumes, directories, files and special types of files called virtual disks (hereinafter generally "blocks") on the disks. However, it will be apparent to those of ordinary skill in the art that the node 200 may alternatively comprise a multi-processor system having more than two processors. Illustratively, one processor 222*a* can execute the functions of the N-module 120 on the node, while the other processor 222*b* can execute the functions of the D-module. It should also be appreciated that processors 222*a,b* may include multiple processing cores, thus improving the processing speed of the processors 222*a,b*.

The memory 224*a, b* illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node 200.

The network adapter 225 comprises a plurality of ports adapted to couple the node 200 to one or more clients 170 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the connection system 180 may be embodied as an Ethernet network or a Fibre Channel (FC) network. Each client 170 may communicate with the node 200 over the connection system 180 by exchanging discrete frames or packets of data according to pre-defined protocols, such as TCP/IP.

The storage adapter 228 cooperates with the storage operating system 300 executing on the node 200 to access information requested by the clients 170. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 140 of the disk array 150. The storage adapter 228 comprises a plurality of ports having input/output (I/O) interface circuitry that couples to the disks over an I/O interconnect arrangement, such as a conventional high-performance, FC link topology.

In accordance with an exemplary embodiment of the present invention, storage of information on each disk array 150 is preferably implemented as one or more volumes that comprise a collection of physical storage disks 140 cooperating to define an overall logical arrangement of volume block number (vbn) space on the volume(s). Each volume is generally, although not necessarily, associated with its own file system. The disks 140 within a volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 140, the storage operating system 300 implements a write-anywhere file system that cooperates with one or more virtualization modules to "virtualize" the storage space provided by the disks 140. A file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system 300 is preferably the NetApp® Data ONTAP® operating system available from Network Appliance Inc., of Sunnyvale, Calif., that implements a Write Anywhere File Layout (WAFL®) file system. However, it is expressly contemplated that any appropriate storage operating system may be enhanced for use in accordance with the inventive principles described herein. As such, the storage operating system 300 should be taken broadly to refer to any storage operating system that is otherwise adaptable to the teachings of this invention.

Figure 3:
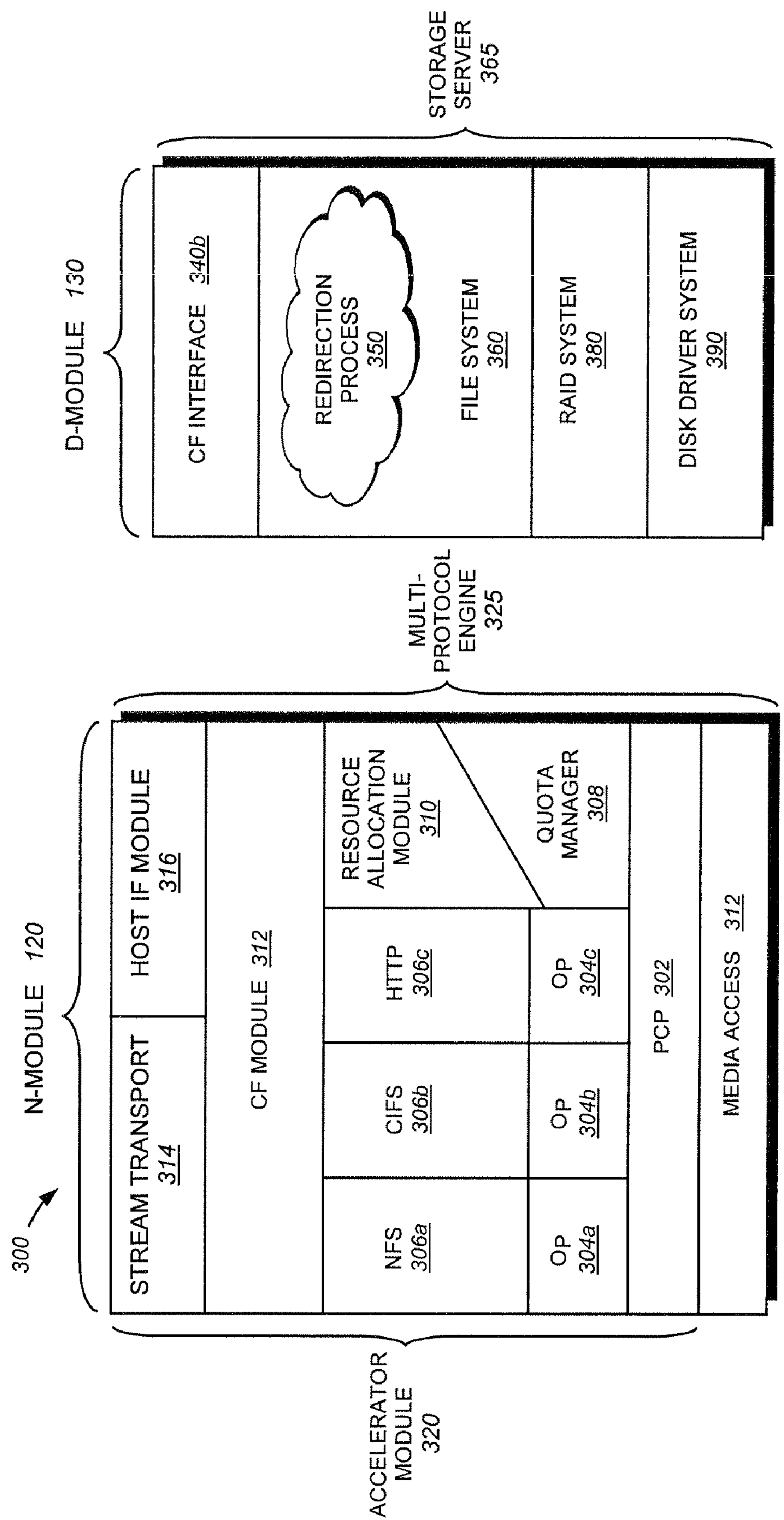
FIG. 3 is a schematic block diagram illustrating a storage operating system including an accelerator module in accordance with an embodiment of the invention.

FIG. 3 is a diagram illustrating the storage operating system 300 in accordance with an embodiment of the invention. The storage operating system 300 comprises a series of software layers organized to form an integrated network protocol stack or, more generally, a multi-protocol engine 325 that provides data paths for clients 170 to access information stored on the node 200 using block and file access protocols. For example, the multi-protocol engine 325 includes a media access layer 312 of network drivers (e.g., gigabit Ethernet drivers) that interfaces to network protocol layers and their supporting transport mechanisms As described herein, the multiprotocol engine 325 further includes an accelerator module 320 that comprises various layers and/or modules adapted to provide network protocol, file access and connection functions, such as a process and connection processor (PCP) module 302, a plurality of operation parsing (OP) modules 304 and protocol handler modules such as NFS/CIFS/HTTP modules 306.

In addition, the storage operating system 300 includes a series of software layers organized to form a storage server 365 that provides data paths for accessing information stored on the disks 140. To that end, the storage server 365 includes a file system module 360, a RAID system module 380 and a disk driver system module 390. As described further herein, the file system 360 includes a redirection process 350 adapted to manage data containers, such as volumes, using redirection identifiers associated with, e.g., the volumes. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules. The file system 360 is illustratively a message-based system that provides logical volume management capabilities for use in access to the information stored on the storage devices, such as disks 140. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 170 is forwarded as a packet over the connection system 180 and onto the node 200 where it is received at the network adapter 225. A network driver of media access layer 312 processes the packet and, if appropriate, passes it on to the network protocol and file access modules/layer for additional processing prior to forwarding to the write-anywhere file system 360. Here, the file system generates operations to load (retrieve) the requested data from disk 140 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 140 and loads the requested data block(s) in memory for processing by the node. Upon completion of the request, the node 200 (and operating system) returns a reply to the client 170 over the connection system 180.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by the client 170. Moreover, in another alternate embodiment of the invention, the processing elements of adapters 225, 228 may be configured to offload some or all of the packet processing and storage access operations, respectively, from processor 222, to thereby increase the performance of the storage service provided by the node 200. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client, or a host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In an illustrative embodiment, the storage server 365 is embodied as D-module 130 of the storage operating system 300 to service one or more volumes of the disk array 150. Within a cluster having multiple D-modules, multiple volumes may be serviced by a single D-module 130, or multiple volumes may be serviced among multiple D-modules. However, any method of distributing multiple volumes among D-modules or multiple volumes sharing a single D-module are possible, as long as the volumes have associated redirection identifiers that redirect data access requests when the data is relocated among the volumes. The redirection process 350 manages the redirection identifiers or "junctions" by interfacing with management commands issued by an administrator via, e.g., a graphical user interface (GUI), command line interface (CLI), or the like.

As noted, illustrative embodiments of the invention provide accelerator module 320 which implements a novel message-passing protocol arrangement to accelerate performance of storage system operations. The accelerator module comprises an implementation of the N-module 120 that is optimized to offload network operations and inter-node communication functions from the D-module 130 without passing non-locally directed data through a shared node bus, such as system bus 223.

Specifically, the accelerator module 320 comprises a plurality of interoperative modules for handling protocol data units (PDUs) in a plurality of network protocol formats. PDUs are contained within one or more network-layer packets. For example a UDP protocol datagram (packet) represents a single PDU. A TCP protocol segment, on the other hand, can include one or more PDUs or fragments of a PDU.

The PCP module 302 receives PDUs from the media access module 312 and performs functions normally associated with the IP and TCP/UDP layers in the operating system. The OP modules 304 for each of a plurality of network protocols communicate with the PCP to establish stream connections for the PDU, allocate resources (such as memory and/or buffers) and provide instructions and data pointers to an appropriate Protocol Handler module. The Protocol Handler module is illustratively embodied as an NFS 306a, CIFS 306b, HTTP 306c server, and forms a file system request to a cluster fabric (CF) module 312. The CF module passes the file system request to a stream trans-port module 314 which determines whether the file system request is directed to a local processor or is otherwise be directed to a different node in the cluster. If the request is directed locally, the stream transport module passes the request to a host interface (HostIF) module 316. The HostIF module passes the request on to the local D-module 130 and releases any resources that were allocated for the module. If the request is directed to another node, the stream transport module 314 appends an address to the request and passes the request back to the PCP module 302. The PDU passes the request on to the network via the media access module 312, and releases the resources that were allocated for the module.

Upon receiving the file system request, the D-module 130 responds by passing a file system response back to the HostIF module 316. If the file system request originated on the local node, the response is sent to the accelerator module on the local node. In such cases, the HostIF module passes the response back to the appropriate Protocol Handler module 306 via the stream transport module 314 and CF module. The Protocol Handler module parses the file system response to form a correct protocol response PDU. The Protocol Handler 306 enqueues the response PDU and provides a pointer for the PCP 402 module to access the enqueued response.

If the file system request originated on the accelerator module of a non-local node, the response is sent to the accelerator module on the non-local node via the accelerator module on the local node. In such cases, the HostIF module passes the response to the PCP module of the local accelerator module via a local stream-transport module. The local PCP module passes the response to a PCP module on the non-local node via a network interface (media access layers). The non-local PCP module passes the response to a stream-transport module on the non-local node. The response is then passed to the non-local CF module and an appropriate non-local Protocol Handler. The non-local Protocol Handler forms and enqueues a correct protocol response PDU and provides a pointer for the PCP module to access the enqueued response.

In sum, the accelerator module 302 includes the PCP module 302, which interfaces to a plurality of protocol-specific OP modules 304*a-c* that, in turn, interface to protocol handlers 306*a-c*. The OP modules 304*a-c* also interface with a quota manager 308 and a resource allocation module 310. The protocol handlers 306*a-c* interface with the CF module 312. The CF module 312 interfaces with a stream transport module (RF module) for passing messages to a local D-module via a Host Interface (HostIF) module 316 or to a remote node via the PCP 302.

Operationally, a new connection between a client and the accelerator module 320 is illustratively established in response to receipt of a PDU, such as a TCP packet from the media access layer 312 at the PCP module 302. In response to the establishment of the connection, the PCP module 302 passes a passiveOpen message including stream connection state information to an appropriate OP module 304*a-c*. The appropriate OP module 304*a-c* to which the connection is bound is determined by the UDP/TCP port on which data was received. For example, if data was received on an NFS port, then the passiveOpen message is passed to an NFS OP module 304*a*.

Figure 4:
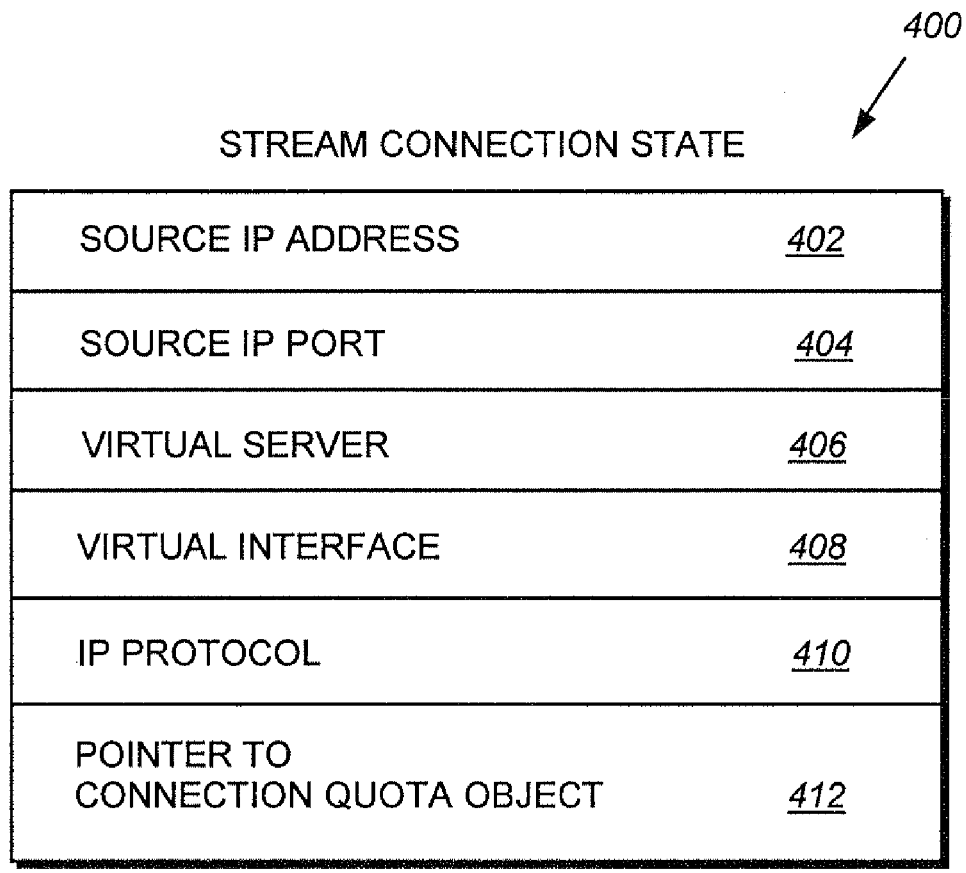
FIG. 4 is a schematic block diagram illustrating a stream connection state in accordance with an embodiment of the invention.

In response to receiving the passiveOpen message, the OP module 304*a-c* initializes a stream connection state for the connection. The stream connection state 400, as shown in FIG. 4, illustratively includes contents of the passiveOpen message indexing a source IP address 402, a source IP port 404, a Virtual Server 406, a Virtual Interface 408, an IP type 410 and a pointer 412 to a connection quota object for the connection.

Figure 5:
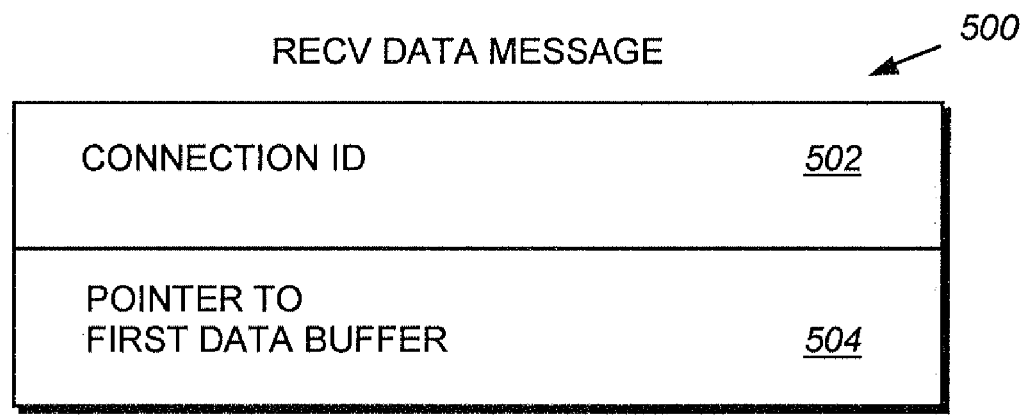
FIG. 5 is a schematic block diagram illustrating a recvData message in accordance with an embodiment of the invention.

Once the connection has been established, the PCP module 302 performs TCP layer functions, strips off TCP headers from the PDU, and passes a recvData message to the appropriate OP module 304*a-c*. The recvData message, 500, as shown in FIG. 5, includes the connection ID 502 of the connection to which the data belongs and a pointer 504 to the first data buffer in a chain of buffers which contain the received data.

The OP module 304*a-c* first determines the PDU boundaries. If the PDU is a UDP datagram, the PDU boundaries are self apparent because the PDU is coextensive with the UDP datagram and comprises all of the data in the buffer chain pointed to in the recvData message 500. If the PDU comprises TCP segment(s) the PDU boundaries are determined by the OP module 304*a-c* according to the an appropriate stream protocol. For example, NFS and CIFS use a TCP record marker to indicate the size of the PDU. Some other protocols, such as HTTP and FTP utilize a specific character sequence to indicate the end of record.

Figure 6:
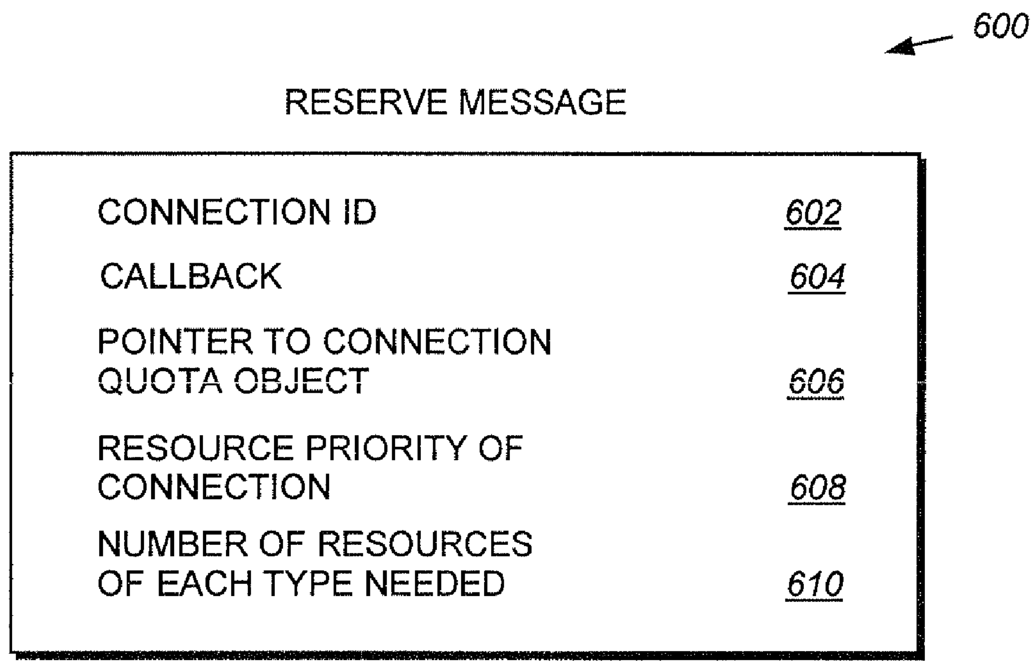
FIG. 6 is a schematic block diagram illustrating a reserve message in accordance with an embodiment of the invention.

Upon determining the PDU boundaries, the OP module 304*a-c* allocates system resources such as memory, buffers and/or processing bandwidth so that the PDU can be examined and possibly translated and executed. The OP module allocates resources by first passing a reserve message to the quota manager 308. The reserve message 600, as shown in FIG. 6, includes the connection identifier 602, a callback 604, a pointer 606 to the connection quota object, a resource priority of the connection 608 and a number of resources of each type needed 610. The quota manager 308 determines whether or not the resource request can be satisfied with the currently available resources while respecting a resource priority 608 included in the reserve message 600. If the request can be fulfilled, resource allocation counts are adjusted and the callback 604 indicated in the reserve message 600 is sent back to the OP module 304*a-c*.

In response to receiving the callback 604, the OP module 304*a-c* allocates memory/buffer resources by associating particular buffers with a CID of a Connection via a function call provided by a resource allocation module (RA module) 310 thereby dedicating the buffers to the Connection. In addition to identifying Connections, CIDs are used to identify certain processes to which certain buffers can be dedicated. For example, an internet protocol (IP) reassembly process that is performed by the PCP module 302 is assigned a CID, even though the process is not a "Connection," so that the RA module 310 can allocate buffers to the process. Illustratively, each CID is considered to "own" buffers that are associated with it. The CID associated with a buffer is written (stamped) in the buffer.

Embodiments of the RA module 310 allocate resources such as packet buffers, data buffers and execution contexts in accordance with a specified priority. The RA module 310 maintains counters and thresholds for each allocated resource. The buffers are maintained in buffer pools controlled by the RA module 310 and are distributed in response to requests to the RA module 301 from the various interoperative modules. In an illustrative embodiment, the resource allocation requests are handled in order of priority by establishing a resource allocation work item priority queue. Alternatively, the resource allocation requests may be handled via a function call interface.

An illustrative buffer pool is an array of 2 kB buffers, and an array of descriptors. The free buffers are maintained in a last-in-first-out (LIFO) queue so that newly-allocated buffers are likely to be in the cache since they were freed recently. The LIFO queue also facilitates detection of bugs wherein, for example, buffers being written to after they are freed. Each free buffer contains a pointer to the next free buffer in the LIFO queue.

Illustratively, packet and data buffers are all of equal size and are used throughout the accelerator module for maintaining connection state information such as TCP, CIFS or HTTP state information, and for passing packet data and connection data between modules. Buffer types used by the accelerator module include Receive (Rx) Packet buffers which provide direct memory access (DMA) to store incoming packets, Internet Protocol Reassembly buffers (IRB), Ingress data buffers (IDB), Execution Context buffers, File System Request buffers, File System Reply Buffers, Egress Operation Buffers (EOB) for storing data until a TCP acknowledge (ACK) is received, and Transmit (Tx) Buffers for sending outgoing packets. It should be understood that, the various buffer types described herein are transient in nature and may physically exist in the same memory space at different times.

Figure 7:
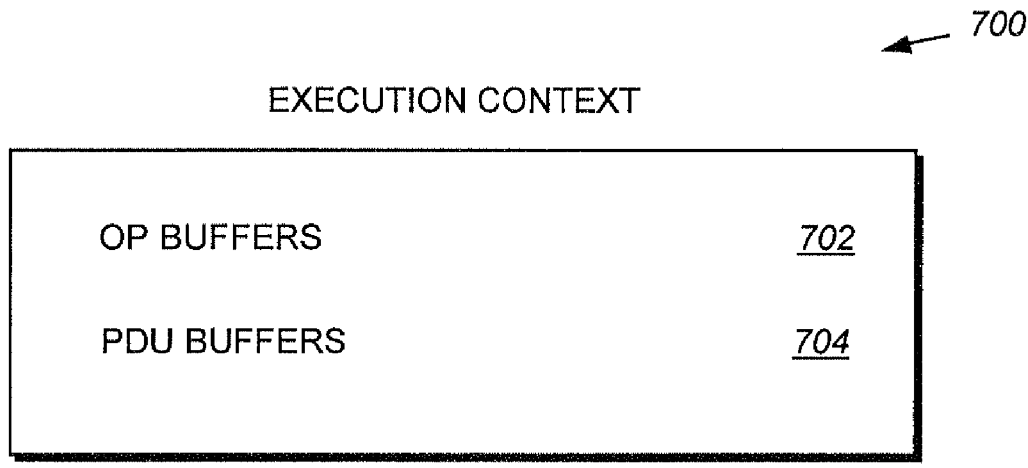
FIG. 7 is a schematic block diagram illustrating an execution context in accordance with an embodiment of the invention.

The OP module 304*a-c* writes information to an execution context that is needed to start parsing and translating the PDU. The execution context 700, as shown in FIG. 7, includes operation parsing buffers (op buffers) 702 and the PDU buffers 704 received from the PCP 302. An execution context 700 holds state information for an operation and contains message queue elements for work items. An execution context 700 can use multiple message queue elements to simultaneously send several file system requests to the D-module 130 at one time. The execution context 700 uses its own state information to determine how to assemble responses it receives. The RA module 310 dedicates an execution context 700 to a Connection or process by associating the execution context 700 with the CID of the Connection or process. The Connections or process is accelerated by having accesses to the dedicated execution context.

Figure 8:
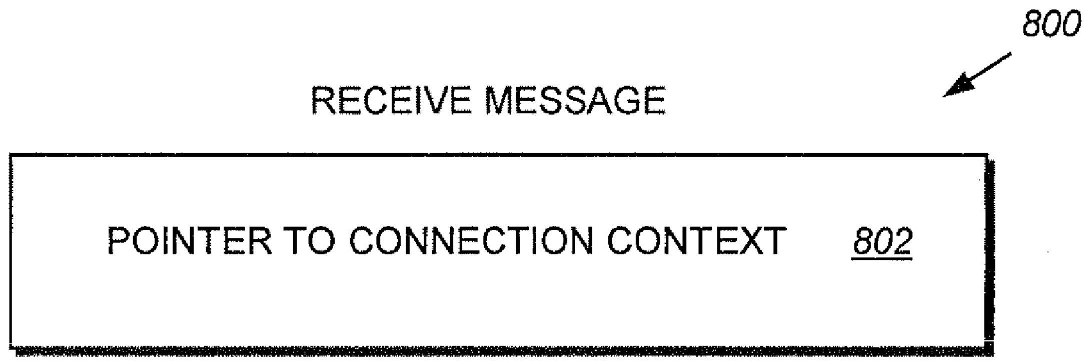
FIG. 8 is a schematic block diagram illustrating a receive message in accordance with an embodiment of the invention.

When the resources are allocated, parsing of the PDU and translation of the PDU into file system (FS) calls are started by passing a receive message from the OP module 304*a-c* to the appropriate protocol handler 306*a-c* which is bound to the respective OP module 304*a-c*. The receive message 800, as shown in FIG. 8, includes a pointer 802 to the execution context 700.

Figure 9:
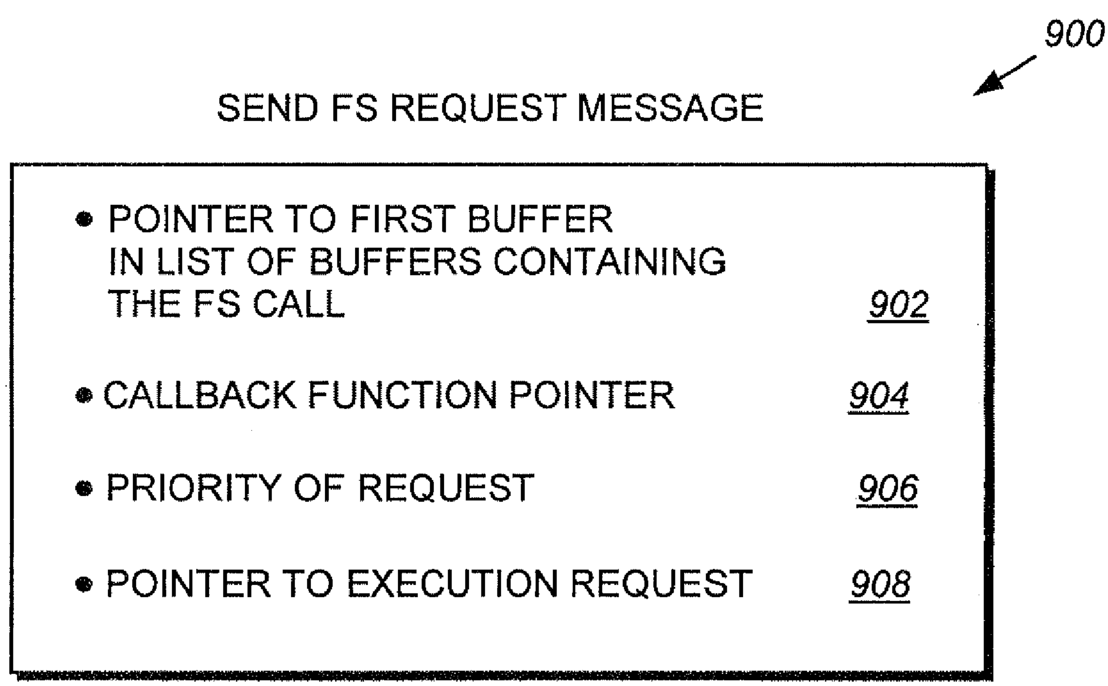
FIG. 9 is a schematic block diagram illustrating a sendFS-Request message in accordance with an embodiment of the invention.

Upon receipt of the receive message 800, the protocol handler 306*a-c* examines the PDU buffers 704 and starts to form FS calls in the op buffers 702. Once an FS call has been formed, the protocol handler 306*a-c* passes a SendFSRequest message to the CF module 312. The SendFSRequest message 900, as shown in FIG. 9, includes a pointer 902 to the first buffer in a list of buffers containing the FS call, a callback function pointer 904, the priority of the request 906 and a pointer 908 to the execution context 700 for which the call is being made.

Upon receipt of a sendFsRequest message 900, the CF module 312 attempts to assign a call channel to the message. Call channels provide a reference identifier to be used to match file system responses from a D-module with a corresponding original file system requests. Call channels also provide a mechanism for limiting the number of file system requests that are outstanding from an N-module to a D-module and to thereby avoid back-pressuring the storage system when a D-module is heavily loaded. If allocated, the call channel is linked to the sendFsRequest message 900. If no call channel can be allocated, the message is queued until a call channel becomes available. A call channel may not be allocated, for example, if no call channel is available or if more that a maximum number of call channels are allocated for a priority 906 threshold that may be indicated in the sendFSRequest message 900.

The CF module 312 determines the destination of the FS request by examining the destination address of the request or by performing a lookup operation. If a lookup is required, the CF modules references a volume location database (VLDB) cache to map a key contained or referenced by the request to a destination D-module. If the lookup operation is successful, the CF module 312 writes the destination D-module address into a stream transport (ST) packet header and writes a call channel index into the FS call header. The CF module 312 also determines over which stream transport connections the FS call should be sent over. If a lookup is not required, the destination D-module address is read from the FS call.

Figure 10:
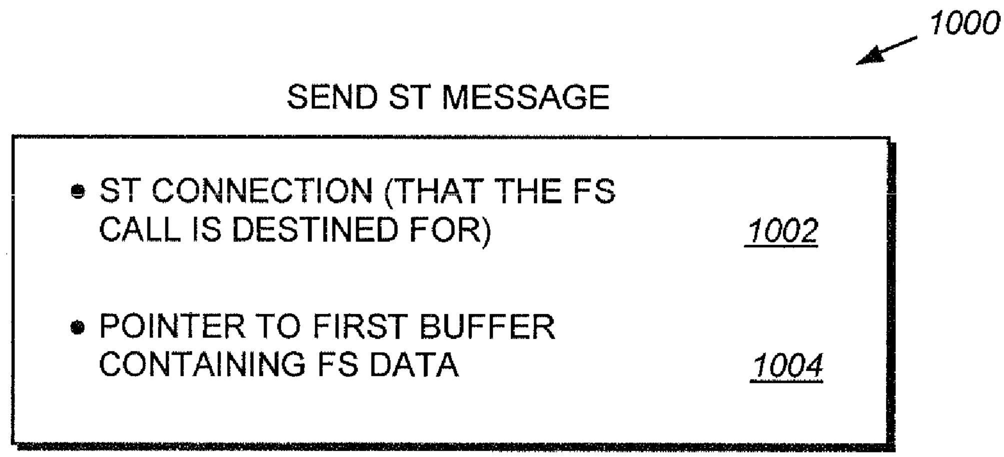
FIG. 10 is a schematic block diagram illustrating a sendST message in accordance with an embodiment of the invention.

Once the destination has been determined, the CF module 312 sends a sendST message to the stream transport module 314. The sendST message 1000, as shown in FIG. 10 includes the stream transport (ST) connection 1002 to which the FS call is destined and a pointer 1004 to the first buffer containing the FS data. Upon receipt of the sendST message 1000, the stream transport module 314 prepends a stream transport header onto the FS call.

Figure 11:
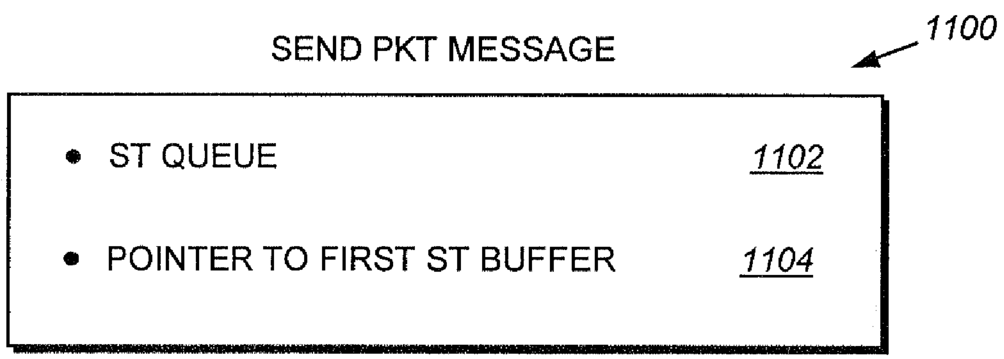
FIG. 11 is a schematic block diagram illustrating a send-PKT message in accordance with an embodiment of the invention.

If the connection is bound to the local D-module 130, the stream transport packet is passed to the HostIF module 316 using a sendPkt message 1100. The sendPkt message 1100, as shown in FIG. 11, illustratively includes a stream transport (ST) queue 1102, and a pointer 1104 to a first stream transport buffer. The HostIF module 316 ensures that the stream transport packet is effectively communicated to the local D-Module 130. The Host IF module 316 then releases its allocated resources.

Figure 12:
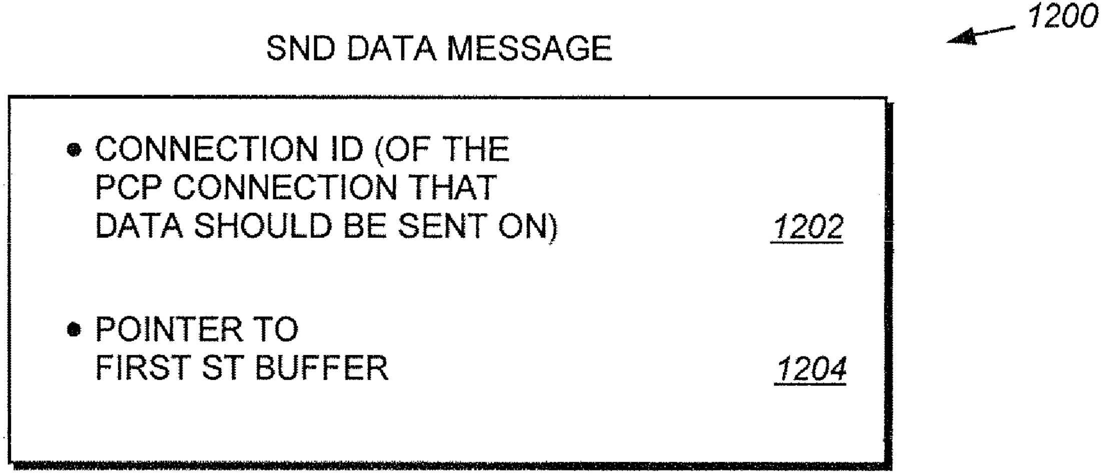
FIG. 12 is a schematic block diagram illustrating a send-Data message in accordance with an embodiment of the invention.

If the connection is bound to the network, the stream transport packet is passed (back) to the PCP 302 using a sndData message 1200. The sndData message 1200, as shown in FIG. 12, illustratively includes the connection ID 1202 of the PCP connection to which data should be sent, and a pointer 1204 to the first stream transport buffer. The PCP 302 ensures that the stream transport packet is effectively communicated to the appropriate node in the network for processing in a remote D-module in the cluster. The PCP module 302 then releases its allocated resources.

Figure 13:
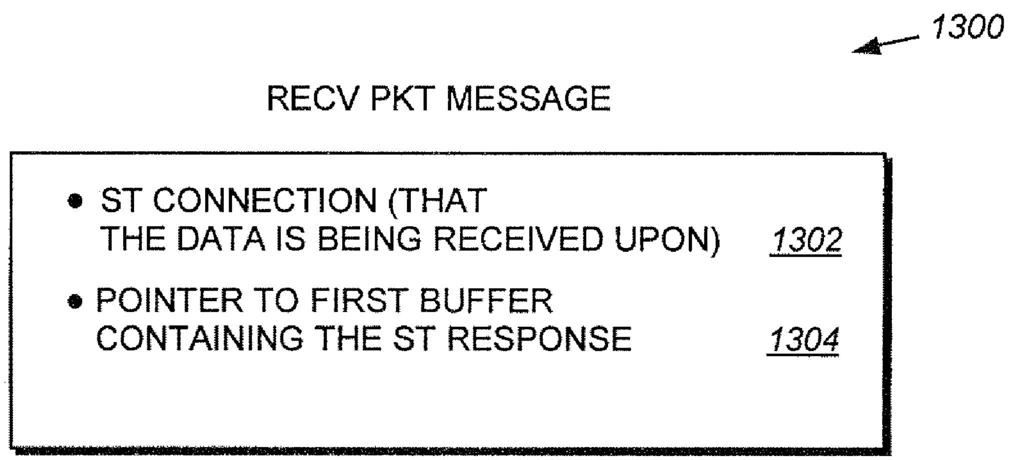
FIG. 13 is a schematic block diagram illustrating a recvPKT message in accordance with an embodiment of the invention.

The D-module 130 sends a FS response back to the HostIF module 316 by encapsulating the response into a stream transport packet and enqueueing it to an appropriate stream transport connection. The HostIF module 316 receives the stream transport packet into local data buffers by copying the packet out of memory on the local D-module 130. Once all of the data is copied into local buffers, the HostIF module 316 passes a recvPkt message 1300 to the stream transport module 314. The recvPkt message 1300, as shown in FIG. 13, contains the stream transport connection 1302 that the data is being received on, and a pointer 1304 to the first buffer containing a stream transport response.

Figure 14:
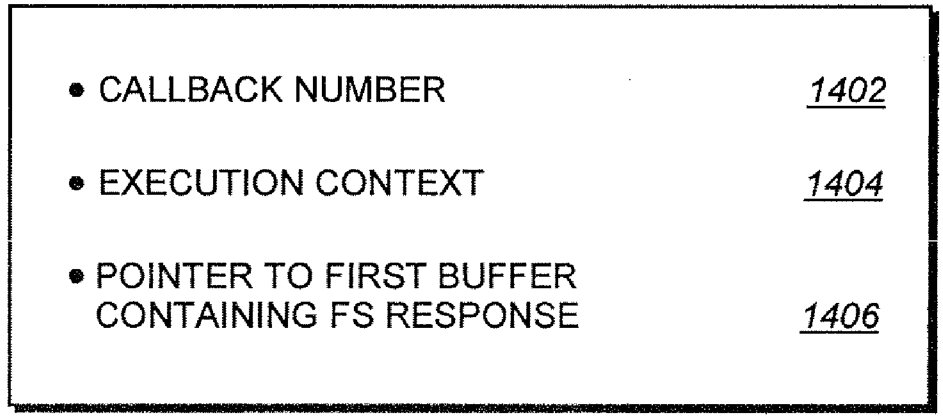
FIG. 14 is a schematic block diagram illustrating a recvFS message in accordance with an embodiment of the invention.
Figure 15:
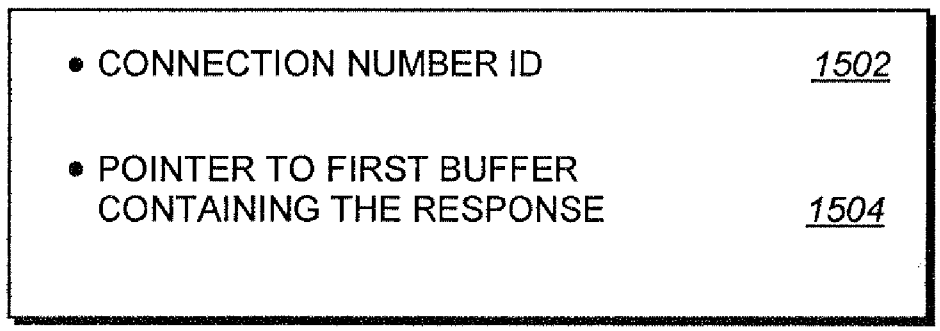
FIG. 15 is a schematic block diagram illustrating a send-Data message in accordance with an embodiment of the invention.

Upon receipt of the recvPkt message 1300, the stream transport module 314 determines whether the stream transport response should be accepted for the connection by examining its sequence number, for example. If the stream transport response is accepted, the stream transport header is stripped off and a FS response is passed from the stream transport module 314 to the CF module 312 via a recvST message. The CF module 312 performs error checking and uses the call channel contained within the FS response to lookup the execution context and call back function registered for the call channel. The CF module 312 then passes a recvFS message 1400 to the appropriate protocol handler 306*a-c*. The recvFS message 1400, as shown in FIG. 14, illustratively includes the callback function 1402, the execution context 1404 and a pointer 1406 to the first buffer containing the FS response.

Upon receipt of the recvFS message 1400, the protocol handler 306*a-c* parses the FS response and forms the correct response PDU into the op buffers previously reserved for the execution context. Once a complete response PDU is formed, it is enqueued for transmission back to the PCP 302. Transmission to the PCP 302 is performed by passing a sndData message 1500 to the PCP 302. The sndData message 1500 illustratively includes a connection number 1502 and a pointer 1504 to the first buffer containing the response PDU.

The accelerator module operations for a PDU are completed when the PCP 302 receives the sndData message, and the execution context is freed by passing a free message to the resource allocation module 310. The free message places the execution context back onto a resource free list.

Although embodiments of the invention are described herein in terms of an "accelerator card," it should be understood by persons having ordinary skill in the art that embodiments of the invention are not necessarily required to reside on any particular physical card, substrate or platform. Rather it is expressly contemplated that embodiments of the invention could include circuitry performing the functions of the accelerator card described herein on any number of cards, substrates, circuits or combinations thereof. Further although embodiments of the invention are described as having a processor on the accelerator card and another processor on residing on the D-module, it should be understood that each of these processors may include a plurality of separate microprocessors within the scope of the invention.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A computer storage system, comprising:

at least one storage system node comprising a local system bus, a local accelerator module connected to the local system bus and configured to perform one or more network operations, and a local storage device element module connected to the local system bus and configured to perform local storage device access operations received through the local system bus; and the local accelerator module further configured to receive a multi-protocol protocol data unit (PDU), wherein the PDU comprises a storage operating system request directed to a non-local clustered storage device element module, the local accelerator module further configured to transform the storage operating system request into a storage operating system call, and the local accelerator module further configured to perform a network operation to direct the storage operating system call to the non-local clustered storage device element module without using the local system bus.

2. The computer storage system according to claim 1 wherein the local accelerator module issues only locally directed storage operating system calls to the local system bus.

3. The computer storage system according to claim 1 wherein the local accelerator module further comprises:

a packet and connection processor (PCP) configured to communicate with a network and further configured to receive PDUs from the network;

at least one protocol-specific operation parser (OP) module configured to communicate with the PCP and further configured to establish one or more stream connections for the PDU, and further configured to provide instructions and data pointers to at least one protocol-specific protocol handler module;

the at least one protocol handler module configured to communicate with the OP module and further configured to receive the instructions and data pointers from the OP module, the at least one protocol handler further configured to form a request to a cluster interface (CF) module;

the CF module configured to communicate with the at least one protocol handler and further configured to pass the request to a stream transport (ST) module; and the ST module configured to communicate with the at least one protocol handler, the ST module further configured to transform the PDU into the storage operating system call.

4. The computer storage system according to claim 3 wherein the ST module is further configured to identify a destination storage device element module for the storage operating system call and further configured to forward the storage operating system call to the destination storage device element module without using local storage device element module processes for non-locally directed storage operating system calls.

5. The computer storage system according to claim 3 wherein the local accelerator module further comprises:

a host interface (HostIF) module configured to communicate with the ST module, the HostIF module further configured to receive a locally directed storage operating system call from the ST module and further configured to communicate the locally directed storage operating system call to the local storage device element module.

6. The computer storage system according to claim 3 wherein the local accelerator module further comprises:

a quota manager configured to communicate with the at least one protocol-specific OP module, the quota manager further configured to determine whether a resource request from the at least one protocol-specific OP module can be satisfied with currently available resources; and a resource allocation module configured to communicate with the at least one protocol-specific OP module, the resource allocation module further configured to allocate requested resources to the at least one protocol-specific OP module.

7. The computer storage system according to claim 1 wherein the storage operating system call comprises a file system call.

8. The computer storage system according to claim 1 wherein the local storage device element module comprises a D-blade.

9. The computer storage system according to claim 1 wherein the local storage device access operations are directed toward one or more disks.

10. The computer storage system according to claim 1 wherein the accelerator module comprises dedicated memory resources configured to reduce demands for system memory resources of the at least one storage system node.

11. The computer storage system according to claim 1 wherein the accelerator module is embodied as a kernel in a storage operating system.

12. The computer storage system according to claim 1 wherein the local system bus comprises a peripheral component interface bus.

13. A computer storage system accelerator module configured to connect to a system bus of a clustered storage system node, comprising:

a packet and connection processor (PCP) configured to communicate with a network and further configured to receive multi-protocol protocol data units (PDUs) from the network;

at least one protocol-specific operation parser (OP) module configured to communicate with the PCP, the OP module further configured to provide instructions to at least one protocol-specific protocol handler module;

the at least one protocol-specific protocol handler module configured to communicate with the OP module to receive the provided instructions and further configured to form a request to a cluster interface (CF) module;

the CF module configured to communicate with the at least one protocol-specific protocol handler and further configured to pass the request to a stream transport (ST) module; and the ST module configured to communicate with the at least one protocol-specific protocol handler, the ST module further configured to transform the PDU into a storage operating system call, the ST module further configured to identify a destination storage device element module for the storage operating system call without accessing the system bus of the clustered storage system node.

14. The computer storage system accelerator module according to claim 13 wherein the ST module is further configured to forward the storage operating system call to the destination storage device element module without writing non-locally directed storage operating system calls to the system bus.

15. The computer storage system according to claim 14 wherein the storage operating system call comprises a file system call.

16. The computer storage system according to claim 14 wherein the destination storage device element module comprises a D-blade.

17. The computer storage system according to claim 14 wherein the storage system node comprises a network element device module separate from a storage device element module.

18. The computer storage system according to claim 14 wherein the accelerator module comprises dedicated memory resources configured to reduce demands for system memory resources of the clustered storage system node.

19. The computer storage system according to claim 14 wherein the accelerator module is embodied as a kernel in a storage operating system.

20. The computer storage system according to claim 14 wherein the local system bus comprises a peripheral component interface bus.

21. The computer storage system accelerator module according to claim 13 wherein the accelerator module further comprises:

a host interface (HostIF) module configured to communicate with the ST module, the HostIF module further configured to receive a locally directed storage operating system call from the ST module and further configured to communicate the locally directed storage operating system call to a local storage device element module.

22. The computer storage system accelerator module according to claim 13 wherein the accelerator module further comprises:

a quota manager configured to communicate with the at least one protocol-specific OP module, the quota manager further configured to determine whether a resource request from the at least one protocol-specific OP module can be satisfied with currently available resources; and a resource allocation module configured to communicate with the at least one protocol-specific OP module, the resource allocation module further configured to allocate requested resources to the at least one protocol-specific OP module.

23. The computer storage system accelerator module according to claim 13 configured as a hardware module connected to a network side of the system bus in the node of the storage system cluster, wherein communications from the hardware module to a local storage device element module traverses the system bus.

24. The computer storage system accelerator module according to claim 23, wherein communications from the hardware module to a non-local storage device element module do not traverse the system bus.

25. A method for accelerating computer storage system operations by a clustered computer storage system, comprising:

receiving at least one protocol data unit (PDU) from a network by an accelerator module connected to a system bus of a node in the clustered computer storage system;

parsing each of the at least one PDUs to form a storage operating system request by the accelerator module;

determining by the accelerator module whether the storage operating system request is directed to a local storage device element module on the node or to a remote node of the clustered computer storage system, wherein the determination is made without the accelerator module accessing the system bus; and communicating non-locally directed storage operating system requests, by the accelerator module, to a non-local storage device element module of the target remote node without accessing the system bus.

26. The method according to claim 25 wherein the accelerator module does not interact with the local storage device element module when the storage operating system request is directed to the non-local storage device element module of the target remote node.

27. The method according to claim 25, further comprising:

determining a protocol of the at least one PDU; and communicating each of the at least one PDUs to an appropriate protocol handler of the node, wherein the parsing is performed by the appropriate protocol handler.

28. The method according to claim 25 further comprising:

communicating only locally directed storage operating system requests to the local storage device element module via the system bus on the node.

29. The method according to claim 25 wherein the storage operating system call comprises a file system call.

30. The method according to claim 25 wherein the local storage device element module comprises a D-blade.

31. The method according to claim 25 further comprising reducing demands for system memory resources of the node using dedicated memory resources of the accelerator module.

32. The method according to claim 25 further comprising embodying the accelerator module as a kernel in a storage operating system.

33. The method according to claim 25 wherein the node comprises a network element device module operatively connected to the local storage device element module.

34. A non-transitory computer readable storage medium stored on a storage device containing executable program instructions executed by a processor, comprising:

program instructions that receive at least one protocol data unit (PDU) from a network by an accelerator module connected to a system bus of a node in a clustered computer storage system;

program instructions that parse each of the at least one PDUs to form a storage operating system request by the accelerator module;

program instructions that determine by the accelerator module whether the storage operating system request is directed to a local storage device element on the node or to a remote node of the clustered computer storage system, wherein the determination is made without the accelerator module accessing the system bus; and program instructions that communicate non-locally directed storage operating system requests, by the accelerator module, to a non-local storage device element module of the target remote node without accessing the system bus.

35. The non-transitory computer readable storage medium according to claim 34 further comprising:

program instructions that determine a protocol of the PDU; and program instructions that communicate the PDU to an appropriate protocol handler of the node, wherein the parsing is performed by the appropriate protocol handler.

36. The non-transitory computer readable storage medium according to claim 34 further comprising program instructions that communicate locally directed storage operating system requests from the accelerator module to the local storage device element module on the node.

37. A computer storage system accelerator module, comprising:

means for receiving at least one protocol data unit (PDU) from a network by an accelerator module connected to a system bus of a node in a clustered computer storage system;

means for parsing each of the at least one PDUs to form a storage operating system request by the accelerator module;

means for determining by the accelerator module whether the storage operating system request is directed to a local storage device element module on the node or to a remote node of the clustered computer storage system, wherein the determination is made without the accelerator module accessing the system bus; and means for communicating non-locally directed storage operating system requests, by the accelerator module, to a non-local storage device element module of the target remote node without accessing the system bus.

* * * * *

UNITED STATES PATENT AND TRADEMARK OFFICE

CERTIFICATE OF CORRECTION

PATENT NO. : 7,937,474 B2
APPLICATION NO. : 12/112522
DATED : May 3, 2011
INVENTOR(S) : Thomas R. Hicks et al.

It is certified that error appears in the above-identified patent and that said Letters Patent is hereby corrected as shown below:

In Col. 18, line 11 should read:
local storage device element module of the ~~target~~ remote In Col. 18, line 62 should read:
module of the ~~target~~ remote node without accessing the In Col. 20, line 12 should read:
a non-local storage device element module of the ~~target~~

Signed and Sealed this
Fifteenth Day of May, 2012

David J. Kappos
*Director of the United States Patent and Trademark Office*